US007968611B2

(12) United States Patent
Demirel et al.

(10) Patent No.: US 7,968,611 B2
(45) Date of Patent: Jun. 28, 2011

(54) PRECIPITATED IRON CATALYST FOR HYDROGENATION OF CARBON MONOXIDE

(75) Inventors: Belma Demirel, Longmont, CO (US); Charles B. Benham, Arvada, CO (US); Jesse W. Taylor, Westminister, CO (US); Pandurang V. Nikrad, Boulder, CO (US); Sara L. Rolfe, Loveland, CO (US); Olga P. Ionkina, Boulder, CO (US); Dawid J. Duvenhage, Evergreen, CO (US); Harold A. Wright, Longmont, CO (US)

(73) Assignee: Rentech, Inc., Los Angeles, CA (US)

( * ) Notice: Subject to any disclaimer, the term of this patent is extended or adjusted under 35 U.S.C. 154(b) by 0 days.

(21) Appl. No.: 12/713,807

(22) Filed: Feb. 26, 2010

(65) Prior Publication Data
US 2010/0152307 A1 Jun. 17, 2010

Related U.S. Application Data (62) Division of application No. 12/189,424, filed on Aug. 11, 2008, now Pat. No. 7,879,756.

(60) Provisional application No. 60/955,142, filed on Aug. 10, 2007, provisional application No. 61/022,566, filed on Jan. 22, 2008.

(51) Int. Cl.
*C07C 27/00* (2006.01)
*B01J 23/00* (2006.01)
*B01J 21/00* (2006.01)
*B01J 20/00* (2006.01)

(52) U.S. Cl. ......... 518/713; 502/330; 502/331; 502/338

(58) Field of Classification Search .................. 518/713; 502/330, 331, 338
See application file for complete search history.

(56) References Cited

U.S. PATENT DOCUMENTS

| | | | | |
|---|---|---|---|---|
| 4,131,568 A * | 12/1978 | Bartish | ............................ | 502/74 |
| 4,503,162 A * | 3/1985 | Windawi et al. | ............... | 502/174 |
| 4,521,394 A * | 6/1985 | Windawi et al. | ............... | 423/363 |
| 4,547,525 A * | 10/1985 | Kim | ................................ | 518/713 |
| 4,605,639 A | 8/1986 | Dryer et al. | | |
| 4,639,431 A | 1/1987 | Gates et al. | | |
| 5,100,856 A * | 3/1992 | Soled et al. | .................... | 502/329 |
| 5,185,378 A * | 2/1993 | Soled et al. | .................... | 518/700 |

(Continued)

OTHER PUBLICATIONS

International Application No. PCT/US2008/072778 International Search Report dated Dec. 22, 2008, 8 pages.

*Primary Examiner* — Cam N Nguyen
(74) *Attorney, Agent, or Firm* — Porter Hedges LLP; Timothy S. Westby, Esq.

(57) ABSTRACT

A method of producing an iron catalyst for catalyzing the hydrogenation of carbon monoxide is disclosed. The method comprises using a reduced amount of acid for iron dissolution compared to certain previous methods. The resulting acidic iron mixture is heated without boiling to obtain a nitrate solution having a $Fe^{2+}:Fe^{3+}$ ratio in the range of about 0.01%: 99.99% to about 100%:0% (wt:wt). Iron phases are precipitated at a lower temperature compared to certain previous methods. The recovered catalyst precursor is dried and sized to form particles having a size distribution between 10 microns and 100 microns. In embodiments, the $Fe^{2+}:Fe^{3+}$ ratio in the nitric acid solution may be in the range of from about 3%:97% to about 30%:70% (wt:wt) and the calcined catalyst may comprise a maghemite:hematite ratio of about 1%:99% to about 70%:30%.

18 Claims, 3 Drawing Sheets

U.S. PATENT DOCUMENTS

| | | |
|---|---|---|
| 6,476,085 B2 | 11/2002 | Manzer et al. |
| 6,740,683 B2 * | 5/2004 | Price .............................. 518/719 |
| 6,777,452 B2 * | 8/2004 | Zhou et al. .................... 518/713 |
| 7,012,104 B2 * | 3/2006 | Espinoza et al. .............. 518/715 |
| 7,071,239 B2 * | 7/2006 | Ortego et al. .................. 518/715 |
| 7,157,404 B1 * | 1/2007 | Jun et al. ....................... 502/330 |
| 7,199,077 B2 | 4/2007 | Hu et al. |
| 2001/0007879 A1 * | 7/2001 | Manzer et al. ................ 518/700 |

* cited by examiner

PRECIPITATED IRON CATALYST FOR HYDROGENATION OF CARBON MONOXIDE

CROSS-REFERENCE TO RELATED APPLICATIONS

This application is a divisional application under 35 U.S.C. §121 of U.S. patent application Ser. No. 12/189,424, filed Aug. 11, 2008, which claims the benefit under 35 U.S.C. §119(e) of U.S. Provisional Patent Application No. 60/955,142 filed Aug. 10, 2007 and U.S. Provisional Patent Application No. 61/022,566 filed Jan. 22, 2008, the disclosures of each of which are hereby incorporated herein by reference.

STATEMENT REGARDING FEDERALLY SPONSORED RESEARCH OR DEVELOPMENT

Not applicable.

BACKGROUND

1. Technical Field

The present invention generally relates to processes for hydrogenating carbon monoxide, and more particularly relates to iron-based compositions for catalyzing such processes, and still more particularly to the manufacture of promoted iron-based catalysts.

2. Description of Related Art

The Fischer-Tropsch process is a well known catalyzed reaction in which carbon monoxide and hydrogen are converted into various forms of hydrocarbons. Catalysts for the reaction are commonly based on iron, sometimes using a precipitated iron-based catalyst that also contains some type of promoter to improve catalyst stability or to affect the properties of the hydrocarbons produced.

U.S. Pat. No. 5,504,118 describes Fischer-Tropsch reaction schemes using certain iron catalysts promoted with potassium and copper in a slurry reactor to produce hydrocarbon products having more than five carbon atoms, water, and alcohols.

German Patent No. 763864 describes certain methods of making iron catalysts for production of hydrocarbons from carbon monoxide and hydrogen under normal or increased pressure (5-50 atm). The catalysts contain bi- and trivalent iron salts and up to 0.5% copper, and are made by heating and precipitating the solutions.

There is continuing interest in the development of iron-based catalysts for catalyzing the hydrogenation of carbon monoxide to form hydrocarbons.

BRIEF SUMMARY

In accordance with certain embodiments of the invention, a method of making an iron catalyst is provided which comprises using a reduced amount of acid for dissolution of the iron starting material, compared to conventional methods. In embodiments, the effective amount of acid in the dissolution of iron produces a nitrate solution having both ferrous ($Fe^{2+}$) and ferric ($Fe^{3+}$) ions. In embodiments, the presence of ferrous ions increases the amount of lepidocrocite ($\gamma$-FeOOH) and/or magnetite [iron (II,III) oxide; $Fe_3O_4$] relative to goethite ($\alpha$-FeOOH) and/or ferrihydrite ($Fe_5HO_8 \cdot 4H_2O$) precipitated from the solution. The increase in the amount of magnetite and/or lepidocrocite relative to ferrihydrite and/or goethite leads to an increased maghemite ($\gamma$-$Fe_2O_3$) to hematite ($\alpha$-$Fe_2O_3$) ratio in the raw catalyst product. For example, in some embodiments, the presence of ferrous ions increases the amount of magnetite relative to ferrihydrite ($Fe_5HO_8 \cdot 4H_2O$) precipitated from the solution which in turn leads to an increased maghemite ($\gamma$-$Fe_2O_3$) to hematite ($\alpha$-$Fe_2O_3$) ratio in the raw catalyst product.

In certain embodiments, a method of manufacturing a catalyst comprising iron, copper and potassium is provided which comprises: preparing an iron nitrate solution having a $Fe^{2+}$:$Fe^{3+}$ ratio (wt %/wt %) in the range of from about 0.01% $Fe^{2+}$:99.99% $Fe^{3+}$ to about 100% $Fe^{2+}$:0% $Fe^{3+}$ and optionally comprising copper; heating at least a portion of the iron nitrate solution to a temperature in the range of about 20° C. to 80° C.; preparing a precipitating agent solution; reducing the temperatures of the iron nitrate solution and the precipitation agent solution to respective temperatures in the range of 25° C. to 35° C., to obtain respective low temperature solutions; and reacting the low temperature nitrate solution with the low temperature precipitating agent at a temperature not exceeding 40° C., to form a precipitate comprising $Fe^{2+}$ and $Fe^{3+}$ phases optionally copper phases. The phases may comprise hydroxides, carbonates, oxides, or any combination thereof. The method may further comprise: ripening the precipitate; washing the resulting ripened precipitate to remove nitrates; aging the resulting washed precipitate; slurrying the resulting aged precipitate and adding a chemical promoter; drying the resulting slurry to form a catalyst precursor; calcining the catalyst precursor to form a raw catalyst; or any combination of at least one of these.

In some embodiments, the method further comprises activating the raw catalyst by exposure to a gas comprising carbon monoxide, hydrogen, or a combination thereof for a selected period of time at selected levels of pressure, temperature, and space velocity sufficient to enhance catalytic activity for hydrogenating carbon monoxide to form higher hydrocarbons.

In embodiments, the catalyst preparation method comprises preparing an iron nitrate solution having a $Fe^{2+}$:$Fe^{3+}$ ratio (wt %/wt %) in the range of from about 3% $Fe^{2+}$:97% $Fe^{3+}$ to about 30% $Fe^{2+}$:70% $Fe^{3+}$ and comprising copper. In embodiments, this comprises mixing together a selected amount of metallic iron or an iron-containing compound and a selected amount of metallic copper in a selected amount of nitric acid having a specific gravity greater than 1.01 and less than 1.40. In certain embodiments, mixing together a selected amount of metallic iron or an iron-containing compound and a selected amount of metallic copper in a selected amount of nitric acid having a specific gravity greater than 1.01 and less than 1.40 comprises separately preparing a copper nitrate solution and an iron nitrate solution, and combining the separately-prepared solutions to form the iron nitrate solution comprising copper.

In certain embodiments, preparing the iron nitrate solution having a $Fe^{2+}$:$Fe^{3+}$ ratio (wt %/wt %) in the range of from about 0.01% $Fe^{2+}$:99.99% $Fe^{3+}$ to about 100% $Fe^{2+}$:0% $Fe^{3+}$ comprises preparing a ferrous nitrate solution by adding metallic iron or an iron-containing compound and a select amount of nitric acid having a specific gravity less than 1.035 and a ferric nitrate solution by adding metallic iron or an iron-containing compound and a select amount of nitric acid having a specific gravity greater than 1.115 and combining them to provide an iron nitrate solution having a specific gravity greater than 1.01 and less than 1.40.

In some embodiments, the weight of nitric acid is 2.8 to 4.5 times the weight of iron in the iron nitrate solution. In some embodiments, the weight ratio of copper to iron in the iron nitrate solution comprising copper is in the range of 0.002 to 0.02.

In other embodiments, the catalyst preparation method comprises mixing together a selected amount of metallic iron or an iron-containing compound in a selected amount of nitric acid having a specific gravity greater than 1.01 and less than 1.40, to obtain an iron nitrate solution having a $Fe^{2+}:Fe^{3+}$ ratio (wt %/wt %) in the range of about 0.01% $Fe^{2+}$:99.99% $Fe^{3+}$ to 100% $Fe^{2+}$:0% $Fe^{3+}$. In these embodiments, copper is added as copper nitrate just prior to spray drying. In these embodiments, preparing the iron nitrate solution having a $Fe^{2+}:Fe^{3+}$ ratio (wt %/wt %) in the range of from about 0.01% $Fe^{2+}$:99.99% $Fe^{3+}$ to about 100% $Fe^{2+}$:0% $Fe^{3+}$ may again comprise preparing a ferrous nitrate solution by adding metallic iron or an iron-containing compound and a select amount of nitric acid having a specific gravity less than 1.035 and a ferric nitrate solution by adding metallic iron or an iron-containing compound and a select amount of nitric acid having a specific gravity greater than 1.115 and combining them to provide an iron nitrate solution having a specific gravity greater than 1.01 and less than 1.40.

In embodiments, an effective ratio of maghemite to hematite is achieved wherein the ratio of percent $Fe^{2+}$ to percent $Fe^{3+}$ in the iron nitrate solution is in the range of from about 3%:97% to about 30:70 (w/w). In some embodiments, the ratio of $Fe^{2+}$ to $Fe^{3+}$ is about 25%:75% (w/w). In specific embodiments, the percentage weight ratio of $Fe^{2+}$ to $Fe^{3+}$ is about 3.3%:96.7%. In other specific embodiments, the percentage weight ratio of $Fe^{2+}$ to $Fe^{3+}$ is about 10%:90%, as in Example 1 hereinbelow. In certain embodiments, the $Fe^{2+}$ to $Fe^{3+}$ weight ratio in the resulting nitrate solution after the heating is about 30%:70%. Example 2 hereinbelow describes an embodiment in which the $Fe^{2+}$ to $Fe^{3+}$ weight ratio in the resulting nitrate solution after the heating is 100%:0%. Example 3 describes an embodiment in which the $Fe^{2+}:Fe^{3+}$ weight ratio in the resulting nitrate solution after the heating is 20%:80%. Example 3 describes an embodiment in which the $Fe^{2+}:Fe^{3+}$ weight ratio in the resulting nitrate solution after the heating is 20%:80%. Example 4 describes an embodiment in which the $Fe^{2+}:Fe^{3+}$ weight ratio in the resulting nitrate solution after the heating is 50%:50%. Example 5 describes an embodiment in which the $Fe^{2+}:Fe^{3+}$ weight ratio in the resulting nitrate solution after the heating is 80%:20%. Example 6 describes an embodiment in which the $Fe^{2+}:Fe^{3+}$ weight ratio in the resulting nitrate solution after the heating is 0%:100%.

The catalyst preparation method comprises heating the iron nitrate solution to a temperature in the range of about 20° C. to 80° C. In other embodiments, the iron nitrate solution is heated to a temperature in the range of from about 40° C. to about 80° C. In some specific embodiments, the iron nitrate solution is heated to a temperature of about 40° C. In other specific embodiments, the iron nitrate solution is heated to a temperature of about 55° C. In some embodiments, the temperature of the mixture is maintained in the range of 25° C. to 80° C. In embodiments, the iron nitrate solution is heated at a rate of temperature increase in the range of from 1° C./min to 20° C./min. In certain embodiments, the iron nitrate solution is heated to about 70° C. at a rate of about 3° C./min.

The catalyst preparation method comprises preparing a precipitating agent solution. In some embodiments, the precipitating agent comprises a compound selected from the group consisting of $NH_4OH$, $Na_2CO_3$, NaOH, $K_2CO_3$, KOH, $(NH_4)_2CO_3$, $(NH_4)HCO_3$, $NaHCO_3$ and $KHCO_3$.

The catalyst preparation method comprises reducing the temperatures of the iron nitrate solution to a temperature in the range of from about 25° C. to about 35° C. to obtain a low temperature iron nitrate solution and reducing the temperature of the precipitating agent solution to a temperature in the range of from about 25° C. to about 80° C. to obtain a low temperature precipitating agent solution, and precipitating a precipitate comprising $Fe^{2+}$ and $Fe^{3+}$ phases and optionally copper phases by reacting the low temperature nitrate solution with the low temperature precipitating agent at a temperature not exceeding 40° C. In embodiments, the precipitating agent is selected from $NH_4OH$, NaOH, KOH, and combinations thereof, and the low temperature precipitating agent solution has a temperature in the range of from about 25° C. to about 35° C. In embodiments, the precipitating agent is selected from $Na_2CO_3$, $K_2CO_3$, $(NH_4)_2CO_3$, $(NH_4)HCO_3$, $NaHCO_3$, $KHCO_3$ and combinations thereof, and the low temperature precipitating agent solution has a temperature in the range of from about 25° C. to about 35° C.

In certain embodiments, the use of low temperature precipitation, as described above, allows for greater control over pH during the precipitation procedure and also allows for improved copper retention, an increase in crystallinity and pore size, and a decrease in surface area, pore volume, and/or crystallite size.

In some embodiments, the catalyst preparation method further comprises ripening the precipitate. In embodiments, ripening the precipitate comprises ripening the precipitate for a period of time ranging from 30 minutes to 60 minutes. In some embodiments, the catalyst preparation method further comprises washing the precipitate. In embodiments, the catalyst preparation method further comprises washing the resulting ripened precipitate. In some embodiments, the catalyst preparation method comprises aging the ripened precipitate or the washed precipitate. Aging may comprises aging for a period of time ranging from 10 minutes to 30 days. In some embodiments, aging may comprises aging for a period of time ranging from 10 minutes to 240 minutes.

In some embodiments, the catalyst preparation method comprises slurrying the precipitate and adding a chemical promoter. In embodiments, the chemical promoter comprises a potassium compound selected from the group consisting of $K_2CO_3$, $KHCO_3$, and KOH. The weight ratio of potassium to iron in the slurry may be between 0.5 K:100 Fe and 1.5 K:100 Fe, for example.

The catalyst method may comprise drying the slurry to form a catalyst precursor. In certain embodiments, the catalyst precursor comprises particles having a size distribution of from about 10 microns to about 100 microns.

The catalyst preparation method may comprise calcining the catalyst precursor. In certain embodiments, calcining comprises calcining the catalyst precursor according to the following program: ramping the temperature at a rate of 30° C./min from about 35° C. to a maximum temperature in the range of 300° C. to 420° C., and holding at the maximum temperature for about 4 hours. In some embodiments, calcining comprises a two-step calcination program wherein the catalyst is heated to a selected maximum temperature twice, with gradual cooling of the catalyst between calcinations. In certain embodiments the use of increased calcination temperature, ramp rate, and dwell time have a significant beneficial influence on the crystallinity, pore size, surface area, pore volume, and/or crystallite size. In some embodiments, calcination temperatures greater than 280° C., preferably greater than 300° C., assist in creating a more attrition resistant catalyst.

In some embodiments, the nitrate solution comprises $Fe^{2+}$:$Fe^{3+}$ in the range of from about 3%:97% w/w to about 30%:70% w/w and the calcined catalyst comprises a maghemite to hematite weight ratio in the range of from about 1%:99% to about 70%:30%. For example, in some specific embodiments the weight ratio of maghemite to hematite in the calcined catalyst is about 30%:70%. In other embodiments the weight ratio of maghemite to hematite in the calcined catalyst is about 10%:90%. In certain embodiments, the calcined catalyst has a maghemite:hematite weight ratio of about 1%:99%.

The product of an above-described process is also provided, in accordance with certain embodiments of the invention. In certain embodiments, the catalyst production methods and the resulting catalysts have improved features compared to other Fischer-Tropsch catalysts and production methods such as reduced acid amount for iron dissolution, precipitation at low temperatures, and selected precipitation time, selected calcination conditions, mechanical properties, including attrition resistance, surface characteristics, and enhanced catalytic performance.

Also provided in accordance with certain embodiments is a catalyst for hydrogenating carbon monoxide, comprising iron, copper and potassium in a weight ratio of 100 Fe:1 Cu:1 K (wt %:wt %:wt %), wherein the iron in the catalyst comprises a maghemite to hematite weight ratio in the range of about 1%:99% to about 70%:30%. The maghemite to hematite weight ratio is determinable qualitatively by peak heights of XRD signals from the primary peaks of hematite and maghemite at 2θ of 33.1° and 33.6°, respectively, and quantitatively using Mössbauer spectroscopy and/or magnetic susceptibility measurements. For example, the maghemite to hematite weight ratio is about 30%:70% in some instances, and about 10%:90% in other instances, as determinable by equivalent peak heights of the respective XRD signals.

In some embodiments, the catalyst comprises a particulate structure with a particle size distribution in the range of 10 μm-100 μm. The catalyst of this disclosure may comprise a BET surface area in the range of from about 45 $m^2/g$ to about 150 $m^2/g$. In some embodiments, the catalyst comprises a BET surface area in the range of from about 45 $m^2/g$ to about 65 $m^2/g$. The catalyst of this disclosure may comprise a mean pore diameter in the range of from about 45 Å to about 120 Å. In embodiments, the catalyst comprises a mean pore diameter in the range of from about 75 Å to about 120 Å. The inventive catalyst may comprise a mean pore volume in the range of from about 0.20 cc/g to about 0.60 cc/g. In some embodiments, the catalyst comprises a mean pore volume in the range of from about 0.20 cc/g to about 0.24 cc/g. The catalyst of this disclosure may comprise a mean crystallite size in the range of from about 15 nm to about 40 nm. In some embodiments, the catalyst comprises a mean crystallite size in the range of from about 25 nm to about 29 nm.

Also provided in accordance with certain embodiments is a process for hydrogenating carbon monoxide to form a Fischer-Tropsch hydrocarbon product. The process includes providing an above-described catalyst, activating the catalyst by exposure to a gas comprising carbon monoxide, hydrogen, or a combination thereof for a selected period of time at selected levels of pressure, temperature, and space velocity, to produce an activated catalyst; and contacting a synthesis gas stream with the activated catalyst in a Fischer-Tropsch slurry-bed reactor whereby a Fischer-Tropsch hydrocarbon product is obtained. These and other embodiments, features and advantages of the present invention will be apparent with reference to the following description and drawings.

BRIEF DESCRIPTION OF THE DRAWINGS

For a more detailed description of the preferred embodiment of the present invention, reference will now be made to the accompanying drawings, wherein.

NOTATION AND NOMENCLATURE

In the following discussion and in the claims, the terms "comprising," "including" and "containing" are used in an open-ended fashion, and thus should be interpreted to mean "including, but not limited to . . . ".

The singular forms "a," "an," and "the" include plural referents unless the context clearly dictates otherwise.

The term "about," when used in the context of a numerical value, means approximately or reasonably close to the given number, and generally includes, but is not limited to, ±10% of the stated number.

"Raw" catalyst refers to a formed, dry catalyst after calcination.

The term "activation" refers to the process whereby the raw catalyst is treated using a gas containing carbon monoxide, hydrogen, or a combination thereof for a period of time under certain levels of pressure, temperature, and space velocity, such that the catalyst is active for catalyzing the hydrogenation of carbon monoxide to form hydrocarbon products.

The term "space velocity" is defined as the volumetric flow rate of synthesis gas (a mixture of hydrogen and carbon monoxide) measured in normal liters per hour divided by the weight of iron in the catalyst contained in the reactor measured in grams.

The term "normal" applies to gaseous material at a temperature of 0° C. and a pressure of 1 atmosphere.

DETAILED DESCRIPTION

Various embodiments of the new iron catalysts are produced by methods in which a reduced amount of acid is used for dissolution of the iron starting material during manufacture of the catalyst than has been conventionally used in the past. This allows for an increased $Fe^{2+}:Fe^{3+}$ ratio compared to existing methods. This increased $Fe^{2+}:Fe^{3+}$ ratio permits an increased ratio of lepidocrocite (γ-FeOOH) and/or magnetite ($Fe_3O_4$) relative to goethite (α-FeOOH) and/or ferrihydrite ($Fe_5HO_8 \cdot 4H_2O$) in the precipitated catalyst precursor. Upon heating, lepidocrocite and/or magnetite forms maghemite (γ-$Fe_2O_3$) and goethite and/or ferrihydrite forms hematite (α-$Fe_2O_3$).

Without wishing to be limited to any particular theory, it is thought that the presence of maghemite in the catalyst creates more defects in the crystal lattice which can act as active sites. The low temperature precipitation allows for greater control over pH during the precipitation procedure and also allows for improved copper retention, an increase in crystallinity, an increase in pore size, a decrease in surface area, a decrease in pore volume, and/or a decrease in crystallite size. Calcination temperature, ramp rate, and dwell time also have a significant influence on the crystallinity, pore size, surface area, pore volume, and/or the crystallite size.

Catalyst Manufacturing Process:

The manufacturing process may include the following basic stages: (1) Preparation of nitrate solution containing iron and, in some embodiments, copper nitrates; (2) Preparation of precipitating agent; (3) Heating the solutions; (4) Precipitation; (5) Ripening; (6) Filtering and Washing; (7) Aging; (8) Chemically promoting (Alkalizing); (9) Drying and sizing; and (10) Calcining. Each of these stages is more particularly described as follows:

1. Preparation of Nitrate Solution Containing Iron and Copper Nitrates.

The catalyst preparation method comprises preparing an iron nitrate solution having a $Fe^{2+}:Fe^{3+}$ ratio (wt %/wt %) in the range of from about 0.01% $Fe^{2+}$:99.99% $Fe^{3+}$ to about 100% $Fe^{2+}$:0% $Fe^{3+}$ and optionally comprising copper. This may be effected by mixing together a selected amount of metallic iron or an iron-containing compound and a selected amount of metallic copper in a selected amount of nitric acid having a specific gravity greater than 1.01 and less than 1.40. A more preferable range is between 1.050 and 1.100 and a most preferable value is 1.080. The ratio of moles of acid to the moles of iron required for specified fractions of ferric nitrate in the solution can be calculated based on stoichiometric balances for the reactions between nitric acid and iron to produce ferric nitrate and ferrous nitrate. The two equations are:

Ferric: $4HNO_3 + Fe \rightarrow Fe(NO_3)_3 + NO + 2H_2O$

Ferrous: $2.5HNO_3 + Fe \rightarrow Fe(NO_3)_2 + 0.25NH_4NO_3 + 0.75H_2O$

Figure 1:
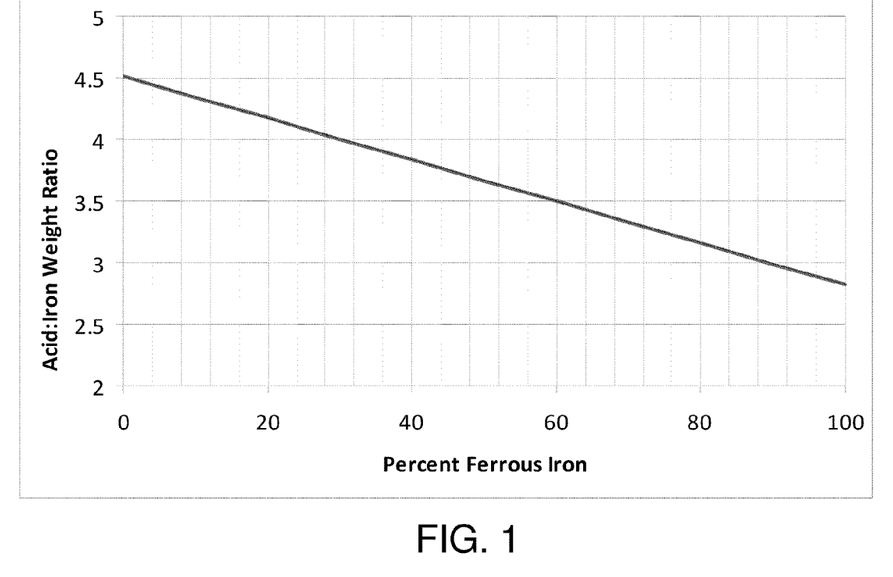
FIG. 1 is a plot of calculated nitric acid to iron weight ratios versus weight percent of ferrous iron in the nitrate solution.
Figure 2:
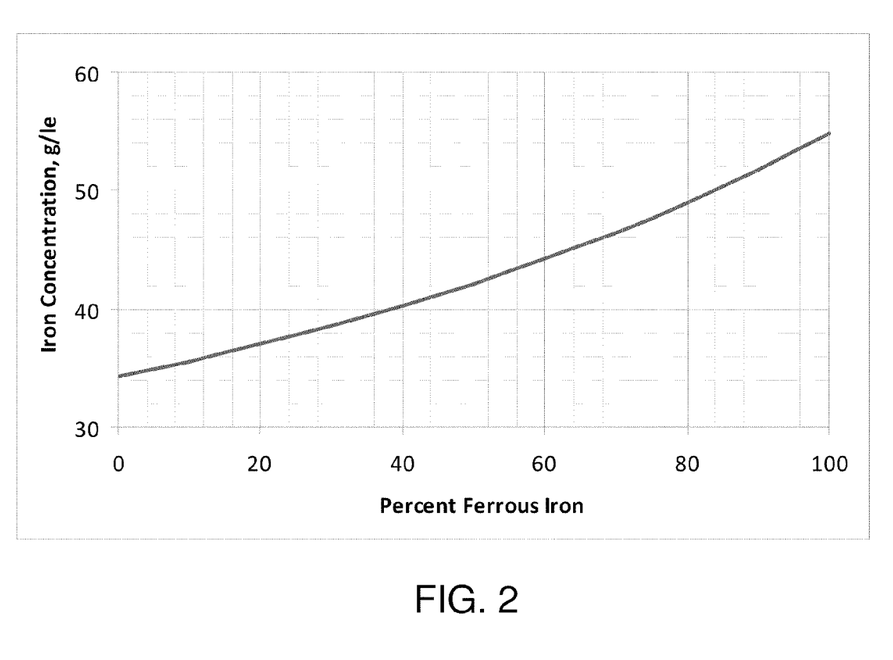
FIG. 2 is a plot of iron concentration in the nitrate solution versus weight percent of ferrous iron in the solution.

By multiplying the ferric equation by the fraction of ferric iron (f) and the ferrous equation by the fraction of ferrous iron (1−f), and adding the two equations, one obtains the following equation:

$(2.5 + 1.5f)HNO_3 + Fe \rightarrow fFe(NO_3)_3 + (1-f)Fe(NO_3)_2 + fNO + 0.25(1-f)NH_4NO_3 + (0.75 + 1.25f)H_2O$ As can be seen in the above equation, the ratio of moles of nitric acid to iron is 2.5+1.5f where f is the fraction of ferric ions in the solution. The weight ratios of acid to iron are determined by multiplying the molar ratio by the ratio of molecular weights of nitric acid to iron, i.e., 63.02:55.85. In FIG. 1, values of weight ratios of nitric acid to iron are plotted vs. weight percent of ferrous iron in the nitrate solution. If it is assumed that a nitric acid solution having a constant specific gravity is used to dissolve the iron over the entire range of ferrous percentages from 0% to 100%, then one can estimate the iron concentration of the nitrate solution. In FIG. 2, the iron concentration is plotted versus the fraction of ferrous iron for a nitric acid specific gravity of 1.080. The concentration of nitric acid in the 1.080 specific gravity solution is 14.3% by weight.

According to the analysis presented above, the ratio of weight of acid to the weight of iron should be between 2.8 and 4.5. At values less than 2.8, there is insufficient acid to dissolve the iron. At values greater than 4.5, there is excess acid beyond that required for dissolution of the iron. A preferred range is between 3.0 and 4.0, and more preferably the value is about 3.55.

Iron from a suitable source is dissolved in the aforementioned nitric acid solution. A suitable grade of iron is one that contains less than 100 ppm by weight of sulfur, and less than 10 ppm of chlorine. The iron can be in powder form or in the form of ingots. The nitrate solution prepared using the aforementioned nitric acid contains both ferrous and ferric ions.

An alternative method for preparing an iron nitrate solution having both ferrous and ferric ions is to prepare the ferrous nitrate and ferric nitrates separately and then mix them together. That is, in embodiments, preparing the iron nitrate solution having a $Fe^{2+}:Fe^{3+}$ ratio (wt %/wt %) in the range of from about 0.01% $Fe^{2+}$:99.99% $Fe^{3+}$ to about 100% $Fe^{2+}$:0% $Fe^{3+}$ comprises preparing a ferrous nitrate solution by adding metallic iron or an iron-containing compound and a select amount of nitric acid having a specific gravity less than 1.035 and a ferric nitrate solution by adding metallic iron or an iron-containing compound and a select amount of nitric acid having a specific gravity greater than 1.115 and combining them to provide an iron nitrate solution having a specific gravity greater than 1.01 and less than 1.40. In alternative embodiments, the nitrate solution comprises 100% $Fe^{2+}$.

In embodiments, the ferrous nitrate solution has a nitric acid concentration of less than about 6 wt %. In embodiments, the ferrous nitrate solution has a nitric acid concentration in the range of from about 4 wt % to about 10 wt %. In embodiments, the ferric nitrate solution has a nitric acid concentration of greater than about 20 wt %. In embodiments, the ferric nitrate solution has a nitric acid concentration of greater than about 25 wt %. In embodiments, the ferric nitrate solution has a nitric acid concentration in the range of from about 20 wt % to about 30 wt %.

By using a nitric acid solution having a specific gravity less than 1.035, ferrous nitrate only can be produced. By using a nitric acid solution having a specific gravity greater than 1.115, ferric nitrate only can be produced. This method can give a more precise ratio of ferrous to ferric ions. However, since ferrous nitrate oxidizes readily to the ferric state, storage of the ferrous nitrate presents a problem. However, the time required for this oxidation is dependent on pH, temperatures and the concentration of other soluble ions. The lower the pH and temperature, the longer time required for the completion of the oxidation reaction. For example, in certain experiments carried out at pH 7.0, the oxidation of $Fe^{2+}$ required 1 hour at 21° C., and required 10 hours at 5° C. At pH 6 and at 5° C., the solution required 100 hours to completely oxidize.

In embodiments, the ratio of percent $Fe^{2+}$ to percent $Fe^{3+}$ in the iron nitrate solution is in the range of from about 3%:97% to about 30:70 (w/w) and the resulting catalyst comprises maghemite and hematite. In some embodiments, the ratio of $Fe^{2+}$ to $Fe^{3+}$ is about 25%:75% (w/w). In specific embodiments, the percentage weight ratio of $Fe^{2+}$ to $Fe^{3+}$ is about 3.3%:96.7%. In other specific embodiments, the percentage weight ratio of $Fe^{2+}$ to $Fe^{3+}$ is about 10%:90%. In certain embodiments, the $Fe^{2+}:Fe^{3+}$ weight ratio in the resulting nitrate solution after the heating is about 30%:70%.

Copper may be added to the catalyst in several different ways: (1) copper metal from a suitable source can be added to the iron and dissolved in the same nitrate solution prior to precipitation; (2) copper nitrate solution can be prepared separately and added to the iron nitrate solution prior to precipitation; (3) copper nitrate may be added to the precipitate after precipitation, and prior to spray drying; or (4) copper may be added using any combination of (1) through (3).

The copper preferably contains no more than 1% impurities. The copper acts as an activation promoter in the catalyst. The weight ratio of copper to iron is preferably between 0.002 to 0.02, more preferably between 0.005 and 0.015, and most preferably between 0.0075 and 0.01. If there exists significant sedimentation or cloudiness in the nitrate solution, the solution may be filtered to remove solids from the solution. In embodiments, as discussed further in (9) hereinbelow, copper is added as copper nitrate just prior to spray drying. The copper nitrate may be added after precipitation and filtration.

In embodiments, the copper nitrate is added with chemical promoter, as described in (8) hereinbelow.

2. Preparation of Precipitating Agent (Chemical Base) Solution.

A 2-10 M aqueous solution of a suitable precipitating agent is prepared. Suitable agents include, but are not limited to, $NH_4OH$, $Na_2CO_3$, $NaOH$, $K_2CO_3$, $KOH$, $(NH_4)_2CO_3$, $(NH_4)HCO_3$, $NaHCO_3$ and $KHCO_3$.

3. Heating the Solutions.

The precipitating agent solution (base solution; e.g., ammonium hydroxide) and the iron nitrate solution are separately brought to temperatures in the range of ambient to near boiling. For example, in some instances the temperature is in the range of 20° C.-75° C. The temperatures of the nitrate solution and the precipitating agent solution may be the same or different. In some instances, the temperature of the precipitating agent solution is 25° C., for example.

The catalyst preparation method comprises heating the iron nitrate solution to a temperature in the range of about 20° C. to 80° C. In other embodiments, the iron nitrate solution is heated to a temperature in the range of from about 40° C. to about 80° C. In some specific embodiments, the iron nitrate solution is heated to a temperature of about 40° C. In other specific embodiments, the iron nitrate solution is heated to a temperature of about 55° C. In some embodiments, the temperature of the mixture is maintained in the range of 25° C. to 80° C. In embodiments, the iron nitrate solution is heated at a rate of temperature increase in the range of from 1° C./min to 20° C./min. In certain embodiments, the iron nitrate solution is heated to about 70° C. at a rate of about 3° C./min. In some instances, the iron nitrate solution is heated to a temperature in the range of 60° C. to 80° C. at a rate of temperature increase in the range of from about 1° C./min to about 20° C./min. In some instances, the solution is heated to a temperature of 70° C. at a rate of increase of about 3° C./min. After heating, the resulting iron nitrate solution has a $Fe^{2+}$:$Fe^{3+}$ ratio in the range of about 0.01%:99.99% to about 100%:0% (w/w). In some preferred embodiments, the resulting iron nitrate solution has a $Fe^{2+}$:$Fe^{3+}$ ratio in the range of about 3%:97% to about 80%:20% (w/w). In other preferred embodiments, the resulting iron nitrate solution has a $Fe^{2+}$:$Fe^{3+}$ ratio in the range of about 3%:97% to about 30%:70% (w/w).

4. Precipitation

The catalyst preparation method comprises reducing the temperatures of the iron nitrate solution and the precipitation agent solution to respective temperatures in the range of 25° C. to 35° C., to obtain respective low temperature solutions, and precipitating a precipitate comprising $Fe^{2+}$ and $Fe^{3+}$ phases (e.g., hydroxides) and, in certain embodiments, copper phase (e.g., hydroxide) by reacting the low temperature nitrate solution with the low temperature precipitating agent at a temperature not exceeding 40° C.

In embodiments, the base solution (precipitating agent solution), at a temperature in the range of ambient to near boiling, is gradually added to the iron nitrate solution to carefully precipitate the iron. In some instances the temperature of the iron solution is about 35° C. and the temperature of the base solution is about 25° C., for example. The pH of the mixture after precipitation ranges from 6.5 to 9.0. For example, in some instances the precipitation pH is 7.1. Preferably, the base solution is gradually added to the nitrate solution. For example, the base solution is added to the nitrate solution over a period of 5 to 180 minutes. In some instances, the base solution is added gradually over a 20-120 minute period.

The low temperature precipitation allows for greater control over pH during the precipitation procedure than was possible with most other catalyst preparation methods in which the temperatures are close to the boiling points of the nitrates and the base. The low temperature precipitation also allows for improved copper retention, an increase in crystallinity, an increase in pore size, a decrease in surface area, a decrease in pore volume, a decrease in crystallite size and or a combination thereof in the resulting catalyst particles.

5. Ripening.

The time period between the end of precipitation to the start of washing the iron hydroxide gel is referred to as "ripening." The particles formed during precipitation can continue to grow and change with time as long as they remain in the liquid from which they precipitated. The changes brought about by ripening are beneficial in increasing the crystallinity of the raw catalyst. In some embodiments, the catalyst preparation method further comprises ripening the precipitate. Preferably the ripening time is in the range of about 30 minutes to about 60 minutes.

6. Filtering and Washing.

In some embodiments, the catalyst preparation method further comprises washing the precipitate. In embodiments, the catalyst preparation method further comprises washing the resulting ripened precipitate. The precipitated mixture comprising iron hydroxides, goethite and/or ferrihydrite and lepidocrocite and/or magnetite and, in some embodiments, copper hydroxides, is filtered and washed to remove residual nitrates. The slurry containing the precipitate may be first pumped from the precipitation vessel into a holding tank located upstream of a vacuum drum filter. The precipitate (catalyst precursor) is allowed to settle in the holding tank, and a clear layer of nitrate solution forms above the solids. This layer is drawn off before the slurry is washed and filtered. A vacuum drum filter fitted with water spray bars may be used for washing the catalyst precursor and concentrating the slurry. To determine when the nitrates have been removed from the catalyst precursor, the conductivity of the filtrate is monitored. The conductivity of the wash water is preferably less than 40 micro mhos and more preferably less than 20 micro mhos. Alternatively, the pH of the filtrate can be used to determine the complete removal of nitrates.

7. Aging.

In some embodiments, the catalyst preparation method comprises aging the ripened precipitate or the washed precipitate. Aging may comprises aging for a period of time ranging from 10 minutes to 30 days. In embodiments, aging may comprises aging for a period of time ranging from 10 minutes to 240 minutes. In embodiments, the washed filter cake (catalyst precursor) obtained from the washing (6) is allowed to age, preferably for a period of time between 10 minutes and 240 minutes. More preferably the filter cake is aged for 30 minutes.

8. Chemically Promoting (Alkalizing).

In some embodiments, the catalyst preparation method comprises slurrying the precipitate and adding a chemical promoter. In embodiments, the chemical promoter comprises a potassium compound selected from the group consisting of $K_2CO_3$, $KHCO_3$, and $KOH$. The weight ratio of potassium to iron in the slurry may be between 0.5 K:100 Fe and 1.5 K:100 Fe, for example. In some embodiments, the catalyst precursor, comprising the iron and copper hydroxide solids obtained from (6), is slurried in a potassium-containing alkaline solution, preparatory to forming the raw catalyst particles. The weight ratio of potassium to iron is preferably between 0.005 and 0.015, more preferably between 0.0075 and 0.0125, and most preferably between 0.008 and 0.010.

As mentioned hereinabove, all or a portion of copper may be added as copper nitrate at this stage or subsequently. In embodiments, copper is added as copper nitrate solution after precipitation and filtration, but prior to spray drying.

9. Drying and Sizing.

The catalyst method may comprise drying the slurry to form a catalyst precursor. In certain embodiments, the catalyst precursor comprises particles having a size distribution of from about 10 microns to about 100 microns.

In some embodiments, within preferably 24 hours of preparing the final solids slurry in (8), the potassium-containing slurry is spray dried to form spherical particles. In some embodiments, copper is added as copper nitrate just prior to spray drying.

The spray dried particles preferably have a size distribution between 1 and 50 microns in diameter, with an average size of 30 microns. More preferably, less than 10% by weight of the particles are smaller than 45 microns and less than 10% by weight of the particles are larger than 100 microns. In embodiments, the median particle diameter is in the range of from about 60 microns to about 90 microns, and in some embodiments the median diameter is in the range of from about 70 microns and about 80 microns. Air classification of the dried catalyst may be used to achieve the desired particle size distribution. The dried particles preferably have a moisture content less than 20% by weight and more preferably less than 10% by weight. Alternate means may be used for drying and sizing that will produce like particles.

10. Calcining.

The catalyst preparation method may comprise calcining the catalyst precursor. In embodiments, the dried catalyst particles from (9) are calcined at a temperature in the range of 300° C. to 420° C., with gradual ramping of the temperature from ambient temperature. In some instances, the temperature is increased to the calcining temperature at a rate between 0.5° C./min and 80° C./min. More preferably the ramp rate is between 5° C./min and 50° C./min, and most preferably between 10 and 40° C./min.

After the calcining temperature has been attained, the temperature is preferably held for a time period. In embodiments, the catalyst is maintained at the calcination temperature for a dwell time period in the range of from about 0.5 hour to about 24 hours. In embodiments, a rotary calciner is utilized, and the calcination dwell time is from about 0.5 hour to about 1.5 hours. In certain embodiments, the dwell time is in the range of from about 3 to about 6 hours. In other embodiments, the dwell time is a time in the range of from about 4 hours to about 5 hours. In embodiments, the dried catalyst particles are calcined for up to 16 hours. In some embodiments, the dwell time is about 24 hours.

Without wishing to be limited by theory, it is postulated that calcining removes tightly bound water from the particles transforming goethite ($\alpha$-FeOOH) and/or ferrihydrite ($Fe_5HO_8 \cdot 4H_2O$) into hematite ($\alpha$-$Fe_2O_3$) and transforming lepidocrocite ($\gamma$-FeOOH) and/or magnetite ($Fe_3O_4$) into maghemite ($\gamma$-$Fe_2O_3$). The calcining imparts strength to the particles.

In some instances a two-step calcination program is carried out. For example, two passes are made in a rotary calciner to simulate rapid heat up in a fluidized bed. The temperature is first calcined at 319° C. for 0.5 hours, ramping from ambient temperature at a rate of increase of 10° C./min, followed by calcining at 319° C. for 8 hours, with ramping at 0.5° C./min from ambient. A multi-step calcining program such as this is believed to broaden the pore diameter of the particles. The calcined catalyst is referred to as raw catalyst.

EXAMPLES

A series of experiments was carried out to determine the pH stability of ferrous/ferric nitrate solutions. In these studies iron powder (Höganäs) and nitric acid (VWR, 68-70%) were used to make iron nitrate solutions. The pH of each solution was measured at room temperature on a regular basis. The following test solutions were prepared:

Ferrous nitrate ($Fe^{2+}$ Nitrate): A ferrous nitrate solution was prepared in an ice bath by dissolving iron powder in nitric acid of specific gravity 1.03122, which corresponds to a nitric acid concentration of 6% by weight. The color of the solution was dark green.

Ferric nitrate ($Fe^{3+}$ Nitrate): A ferric nitrate solution was prepared by dissolving iron powder in nitric acid of specific gravity 1.1469, which corresponds to a concentration of nitric acid of 25% by weight. The color of the solution was green indicating that perhaps not all of the iron was in the ferric state.

Preparation of ferrous (25 wt %)/ferric nitrate (75 wt %) solution ($Fe^{2+}/Fe^{3+}$ Cold). A ferrous (25 wt %)/ferric nitrate (75 wt %) solution was prepared by mixing appropriate amounts of ferrous and ferric nitrate solutions at room temperature. The color of the solution was green.

Preparation of ferrous (25 wt %)/ferric nitrate (75 wt %) solution ($Fe^{2+}/Fe^{3+}$ Hot): A ferrous nitrate (25 wt %)/ferric nitrate (75 wt %) solution was also prepared by mixing ferrous and ferric nitrate solutions. Prior to mixing at room temperature, the ferric nitrate solution was heated to 65° C. to make sure all of the iron was ferric. The color of the ferric nitrate solution turned to red while nitric oxide was given off. After mixing the two nitrate solutions, the color of the solution was green.

The time required for oxidation of ferrous nitrate to ferric nitrate in the presence of air is dependent on pH, temperature and the presence of other soluble ions. The lower the pH and temperature, the longer time required for the completion of the oxidation reaction. If dissolved oxygen is present at pH levels above about 7.0, oxygen can be an electron acceptor according to the following equation:

$$Fe^{2+}+\tfrac{1}{4}O_2+H^+ \rightarrow Fe^{3+}+\tfrac{1}{2}H_2O$$

In an acidic environment, the nitrate can be an electron acceptor:

$$Fe^{2+}+4/3H^+ \rightarrow Fe^{3+}+\tfrac{1}{3}NO+\tfrac{1}{3}H_2O$$

The pH of each nitrate solution was measured with time and is listed in Table 1. While the pH of each nitrate solution changed, the color of the solutions also slowly changed to red from green in about a week although it is hard to observe gradual change by eye. As the ferrous nitrate was oxidized, yellow "oxides" were precipitated.

In embodiments, yellow sediments comprising lepidocrocite were observed in the bottom of the ferrous nitrate ($Fe^{2+}$ nitrate) solution in less than 24 hours. Analysis by XRD revealed the sediments to comprise lepidocrocite and ferrihydrite in some instances. The results from this experiment show that ferrous iron tends to go to ferric iron while pH changes from 5 to about 1.6. This decrease in pH may be due to the gradual hydrolysis of ferrous ions to produce FeOOH and $H^+$ in the presence of air. The change in pH was very fast at the beginning, and slowed down at lower pH values (see Table 1).

TABLE 1 pH Values of Nitrate Solutions

| | pH | | | |
|---|---|---|---|---|
| Time, h | $Fe^{2+}$Nitrate | $Fe^{3+}$Nitrate | $Fe^{2+}/Fe^{3+}$ Cold | $Fe^{2+}/Fe^{3+}$ Hot |
| 3.00 | 5 | 0.3 | 0.5 | 1.57 |
| 18.00 | 3[1] | 0 | 0.4 | 1.72 |
| 27.00 | 2.8 | 0 | 0.4 | 1.65 |
| 126.00 | 2.42 | 0 | 0.47 | 1.49[1] |
| 149.00 | 2.43 | 0 | 0.62 | 1.51 |
| 173.50 | 2.34 | 0.17 | 0.76 | 1.42 |
| 196.50 | 2.26 | 0.31 | 0.94 | 1.35 |
| 270.25 | 2.25 | 0.89 | 1.26 | 1.45 |
| 292.50 | 2.18 | 0.77 | 1.24 | 1.36 |
| 318.50[2] | 2.08 | 0.72 | 1.2 | 1.28 |
| 434.75 | 2.09 | 0.8 | 1.36 | 1.36 |
| 458.75 | 2.1 | 0.86 | 1.39 | 1.38 |
| 483.75 | 2.09 | 0.98 | 1.46 | 1.45 |
| 937.00 | 1.63 | 0.52 | 1.02 | 1.07 |
| 963.50 | 1.82 | 0.75 | 1.28 | 1.22 |
| 988.00 | 1.78 | 0.74 | 1.27 | 1.19 |
| 1013.00 | 1.84 | 0.81 | 1.31 | 1.25 |
| 1034.50 | 1.68 | 0.67 | 1.18 | 1.12 |
| 1106.75 | 1.59 | 0.63 | 1.11 | 1.04 |

[1]Sediments observed in the bottom of the solution bottle.
[2]Color of the solutions turned to red.

The pH of $Fe^{3+}$ nitrate solution was very close to zero, and in preferred embodiments was steady for at least a week. The color of the solution changed to red from green with time. This may be explained by ionic equilibrium in the solution.

In the 'Cold' case, ferrous nitrate and ferric nitrate solutions were mixed at room temperature. Ferrous (25 wt %)/ferric nitrate (75 wt %) solution ($Fe^{2+}/Fe^{3+}$ Cold) also showed a change in pH. The color of the solution changed to red with time, and no sediments were observed. Specific gravity of this solution was calculated to be 1.1179 which is close to the 1.115 value at which ferric nitrate alone can be formed. It appeared that ferrous nitrate in the solution was converted to ferric nitrate without leaving any deposit behind, suggesting that the oxidation occurred via oxygen in the air.

In the "Hot" example, ferrous nitrate and ferric nitrate solutions were prepared using 6% and 25% nitric acid solutions, the same as in the $Fe^{2+}/Fe^{3+}$ 'Cold' case. However, ferric nitrate solution was heated to 65° C. to make sure all the iron is in ferric ($Fe^{3+}$) state. The ferric nitrate solution was then cooled to room temperature and mixed with ferrous ($Fe^{2+}$) nitrate solution at room temperature. Ferrous (25 wt %)/ferric nitrate (75 wt %) solution ($Fe^{2+}/Fe^{3+}$ Hot) showed changes in pH which was around 1.5 at the beginning, and decreased to 1 in time. Precipitation of ferric hydroxide was observed after the first 300 hours and slowly increased in time. Heating ferric nitrate prior to mixing ferrous and ferric nitrate solutions may have created a media that can form ferric hydroxide by hydrolysis reaction, which is dependent on the concentration, time, temperature, acidity and the presence of other substances in the solution. Oxidation of ferrous to ferric occurs at a much lower rate at lower pH and any insoluble ferric hydroxide formed is not precipitated as readily at low pH.

Inventive catalysts formed from nitrate solutions comprising $Fe^{2+}:Fe^{3+}$ ratios of 10:90 (Example 1); 100:0 (Example 2); 20:80 (Example 3); 50:50 (Example 4); and 80:20 (Example 5); respectively are presented in Examples 1-5 which follow. Example 6 hereinbelow describes a catalyst formed from a nitrate solution comprising a $Fe^{2+}:Fe^{3+}$ ratio of and 0:100 (Example 6) and is presented for comparison with the inventive catalysts.

Example 1

Preparation of a Copper, Potassium Promoted Iron Catalyst Prepared with ~10% Ferrous/90% Ferric Nitrate Solution (Inventive Catalyst)

This example delineates the steps in the preparation of a representative raw catalyst. The following reagents were employed: iron powder (Höganäs, 98.61% Fe, −325 mesh); copper powder, (Alfa Aesar, −40 +100 mesh), 99.5% metals basis; potassium carbonate, $K_2CO_3$ (Alfa Aesar), ACS reagent grade; nitric acid, 70% (Fisher), certified ACS PLUS grade; ammonium hydroxide, (EMO) 160 mL, ACS reagent grade; and deionized (DI) water. The catalyst was prepared according to the following procedure:

1. 20.186 g iron powder and 0.200 g copper powder were slurried with 100 mL DI water to prevent hot spots due to exothermic reaction during the dissolution process.

2. Nitric acid (100.8 g of 70% $HNO_3$) was dissolved in 302 mL DI water. Reduced acid amounts will produce excessive maghemite in the final oxide product.

3. With mechanical stirring, the nitric acid solution was added to the iron slurry dropwise over 75 minutes. The addition rate was such that the temperature of the iron solution did not go above 35° C. Light $NO_x$ evolution is observed above 40° C.

4. After complete addition of the nitric acid solution the dark green iron solution was stirred until the iron was completely dissolved.

5. This "iron and copper nitrate" solution was then heated to 70° C. at about 3° C./min. Above 60° C. (65-70° C.), NOx gases with reddish brown color were produced. During this heating period the color of the mixture changed from dark green to red/brown. The $Fe^{2+}:Fe^{3+}$ weight ratio of the nitrate solution is about 10/90.

6. A 14.5% ammonium hydroxide solution was prepared by combining equal volume portions of 29% ammonium hydroxide and DI water.

7. The base solution was added slowly to the Fe/Cu nitrate solution (35° C.) over 60 minutes while monitoring the pH of the solution. At pH 2.5 to 4, a voluminous precipitate formed and the stirring became inefficient. The addition of the base was stopped temporarily to regain stirring efficiency. Base addition was then continued until the pH reached 7.1±0.1.

8. The mixture was then stirred at 35-25° C. (no heating necessary) for 30 minutes while a pH of 7.1±0.1 was maintained. A sample of the mixture was obtained.

9. The mixture was filtered and washed three times with 1000 mL of water. The pH of the filtrate was monitored with a pH meter, first filtrate pH about 7.15, second filtrate (1st wash) pH about 7.10, third filtrate (2nd wash) pH about 7.05, forth filtrate (3rd wash) pH about 6.6. The residue was washed further until the pH did not change. Preferably a water conductivity number of below 40 micro mho, more preferably below 20 micro mho is measured. Alternatively, another suitable method may be used to measure residual nitrates.

10. The filter residue was dried sufficiently so that it was easily removed from the filter paper, but not so that it was totally dry.

11. The filtered residue was slurried with 0.352 g potassium carbonate dissolved in 10 mL of DI water to generate an 11-12 wt % solids mixture.

12. Four batches of slurry were prepared according to the procedure described in steps 1 through 12 and mixed together. This mixture was spray dried to spherical particles using a Type H Mobile Niro spray dryer consisting of a two-fluid nozzle atomizer, drying chamber, air disperser, chamber, product collection section, air ducts, cyclone, exhaust fan, air heater, and instrument panel. Using the Type H Mobile Niro spray dryer, the "feed" was introduced through a nozzle from the bottom with the drying air cross flowing from the top under the following conditions: Inlet Temperature: 370° C. (±2); Outlet Temperature: 105° C. (±2); Slurry Solids Content: 11% (±1); Water Setup Flow 4.0 to 4.5 kg/hr (feed flow is set with water, and then switched to actual feed slurry); and Atomizer Air Flow at 1 bar pressure set between 2 and 6 kg/h, more preferably between 3 and 5 kg/h and most preferably between 3 and 4 kg/h.

13. The spray dried material was then calcined by heating to 300° C. at 30° C./min and holding at that temperature for 16 hours, Catalyst Physical Properties The preferred properties of the catalysts made according to the procedure of Example 1 will be described in this section.

In embodiments, the catalyst has ratios of 100 Fe/1 Cu/1 K (w/w/w). This theoretically corresponds to 68.496% Fe, 0.685% Cu and 0.685% K, by weight.

In embodiments, the catalyst particles are spherical in shape, and the particle size distribution is in the range of 10 µm-100 µm.

The BET surface area of the catalyst may be in the range of from about 45 $m^2/g$ to about 85 $m^2/g$. The BET surface area of the catalyst may, in embodiments, be in the range of from about 65 $m^2/g$ to about 85 $m^2/g$.

The pore diameter of the catalyst produced according to Example 1 may be in the range of from about 75 Å to about 120 Å.

The pore volume of the catalyst produced according to Example 1 may be in the range of from about 0.20 cc/g to about 0.24 cc/g.

The XRD of the catalyst according to Example 1 may have signals from the primary peaks of Hematite and Maghemite (2θ of 33.1° and 33.6°), with approximately equivalent peak heights.

The catalyst may have a crystallite size in the range of from about 25 nm to about 9 nm.

The catalyst may exhibit a maximum reduction by TPR at temperatures between 250° C. and 275° C. In some embodiments, the catalyst may exhibit a maximum reduction by TPR at temperatures between 250° C. and 265° C.

The Loss on Ignition (LOI) of the catalyst may be less than 6%.

Elemental Analysis of catalyst according to Example 1 may show copper in the range of from about 0.58% to about 0.68% and potassium in the range of from about 0.67% to about 0.77%, as analyzed by Atomic Adsorption Spectroscopy.

The catalyst activity over 500 hours on stream may provide a CO conversion greater than 80%. The carbon dioxide selectivity may be between 37% and 43% by volume. The methane selectivity is preferably between 0.8% and 1.2% by volume. The catalyst deactivation rate is preferably less than 1% per week. Standard activation and reaction conditions for catalyst performance were: Activation: 275° C., 140 psig, space velocity: 2.5 nl/g Fe/h, $H_2/CO=1.4$; Reaction: 255° C., 375 psig, space velocity 3.45 nl/g Fe/h, $H_2/CO=0.77$.

In embodiments, the purity of the catalyst is as shown in Table 2. It is possible that the purity of the final catalyst may be improved by selecting a higher purity iron source.

TABLE 2

Catalyst Contaminants

| Contaminant | ppm |
| --- | --- |
| Nitrate | <5000 |
| Sulfur | <500 |
| Chlorine | <200 |
| Aluminum | <700 |
| Calcium | <50 |
| Chromium | <250 |
| Magnesium | <500 |
| Manganese | <1500 |
| Silicon | <1500 |
| Sodium | <50 |
| Titanium | <1500 |
| Vanadium | <1000 |
| Zinc | <200 |
| Phosphorus | <100 |
| Nickel | <400 |
| Cobalt | <100 |
| Lead | <50 |

Analytical Methods Used to Determine Catalyst Properties:

X-Ray Diffraction Analysis (XRD). X-ray diffraction analysis was carried out using the following scan parameters: Range (2θ) 7.0100 to 89.9900; Step size (2θ) 0.0200; Time per step (s) 0.35; Number of data points 4150; Minimum (counts/sec) 0.00; Maximum (counts/sec) 1331; Scan mode Continuous; Diffractometer, Configuration and Settings: Control unit PW3710, Goniometer PW1050, Generator PW1830/00, Generator tension (kV) 40, Generator current (mA) 40, X-ray tube PW2773 Cu Long Fine Focus, Tube focus Line, Take off angle (°) 6.0000, Divergence slit Fixed slit 1°, Incident beam radius (mm) 173.00 Incident bead soller slit 0.04 rad, Diffracted beam radius (mm) 173.00, Receiving slit height, Fixed slit 0.2 mm, Detector PW3011, BET Surface Area. Analysis was performed using a Quadrachrome NOVA 2000e or a Quadrachrome Quadrasorb instrument. Surface areas and pore sizes were determined from multi-point nitrogen volume/partial pressure isotherms using the BET method. Pore diameters were determined using BJH desorption dv method. Samples were vacuum degassed at 100° C. for 4 hours.

Adsorption points: P/Po=0.050000, 0.009167 M, 0.013330 M, 0.017500 M, 0.021667 M, 0.025833 M, 0.030000 M, 0.032500, 0.106938, 0.180577, 0.254615, 0.328654, 0.402692, 0.476731, 0.550769, 0.624808, 0.698846, 0.772885, 0.896923, 0.920962.

Desorption points: P/Po=0.995000 V P, 0.995750 P, 0.896500 P, 0.8472550 P, 0.798000 P, 0.748750 P, 0.699500 P, 0.650250 P, 0.601000 P, 0.55175 P, 0.502500 P, 0.453250 P, 0.404000 P, 0.354750 P, 0.305500 P, 0.256250 P, 0.207000 P, 0.157750 P, 0.108500 P, 0.059250 P, 0.010000 P.

Temperature-Programmed Reaction (TPR). A 20-25 mg sample was weighed out and placed within the sample tube on top of a quartz wool plug. The tube was connected to the main instrument housing of a Micromeritics ChemiSorb 2750 w/ optional ChemiSoft TPx System using knurled nuts and a compression O-ring. The provided programmable instrument furnace, capable of reaching 1100° C., was placed around the sample tube. A thermocouple was installed through the top of the sample port and down into the sample tube using a Teflon ferrule and oriented so the tip was embedded just slightly in the sample mass. The sample was then degassed at 150° C. under a 50 mL/min flow of nitrogen for one hour and then allowed to cool under that same atmosphere prior to testing. Once the sample had cooled, the nitrogen gas was turned off and the testing gas (10% $H_2$ in Argon) was turned on and allowed to flow over the sample for 15 minutes at 50 mL/min prior to testing. A frozen isopropyl alcohol cold trap was prepared and placed around the cold trap on the instrument in order to freeze out water generated during testing prior to the test gas running through the thermal conductivity detector (TCD). In one experiment the furnace temperature was ramped from room temperature to 350° C. at 5° C./min under a test gas flow of 50 mL/min. The furnace temperature may be ramped to as much as about 450-500° C. Changes in TCD signal are charted on the instrument software vs. both time and temperature as registered on the internal thermocouple.

Metals Content (% Cu and % K). These protocols have been applied to catalyst formulations which are basically 98% iron oxides, 1% copper oxides, and 1% potassium oxide. Other compounds may be present in minimal concentrations as contaminant species.

Digestion Procedure: a) Weigh catalyst sample (100±10 mg) into a 50 mL beaker with a watch glass cover; b) Add 10 mL of 35% $HNO_3$; c) Bring to a gentle boil for 45 minutes of refluxing. Maintain volume between 5 mL and 10 mL with de-ionized water; d) Cool on lab bench for 1-3 minutes; e) Add 5 mL of concentrated HCl; f) Bring to a gentle boil for 15 minutes of refluxing; g) Cool on lab bench for 1-3 minutes; h) Remove watch glass cover and if necessary, return to hot plate to reduce volume to about 10 mL; and i) Transfer digestate to 100 mL volumetric flask (Class A) and bring to volume with % $HNO_3$. This is called the diluted digestate.

Analysis Procedure: a) Prepare calibration standards from certified primary standard; b) Dilute 1.000 mL of diluted digestate into a 10 mL volumetric flask (Class A) with desired matrix for element of interest. The dilution matrix used is dependent upon the matrix of the primary standard. This dilution step can be modified to produce samples with concentrations of analyte within the range of the calibration standards. Potassium samples require an ionization suppressant of 0.1-0.2% CsCl or RbCl; c) Analyze calibrations standards and unknowns by atomic absorption spectrophotometry using a suitable apparatus such as a Shimadzu AA-6501 equipped with a graphite furnace and autosampler.

Crystallite Size. Crystallite Size was calculated using the Full Width Half Maximum (FWHM) of the XRD peaks and the Scherrer Equation (1918). A highly crystalline hematite sample (Aldrich, >98%, approximately 5 μm) was scanned and the FWHM of its peaks were used in the calculations. The crystallite size was calculated for 4 peaks and averaged. The 4 hematite peaks were at 2θ values of 24.1°, 40.8°, 49.4°, and 51.4°.

The above-described catalyst preparation method allows for control over major preparation parameters. The reduced amount of acid for dissolution of the iron starting material allows for an increased $Fe^{2+}:Fe^{3+}$ ratio. In the final raw catalyst product this increased $Fe^{2+}:Fe^{3+}$ ratio imparts an increased maghemite ($\gamma$-$Fe_2O_3$):hematite ($\alpha$-$Fe_2O_3$) ratio. The increased maghemite:hematite ratio in the raw catalyst provides a catalyst having higher activity for carbon monoxide conversion than does a raw catalyst comprising hematite only. The low temperature precipitation allows for greater control over pH during the precipitation procedure and also allows for improved copper retention, an increase in crystallinity and pore size, and a decrease in surface area, pore volume, and crystallite size. Calcination temperature, ramp rate, and dwell time also have a significant influence on the crystallinity, pore size, surface area, pore volume, and/or crystallite size.

In Table 3 certain data are listed for Example 1.

TABLE 3

Summary of Parameters for Example 1

| Process step/component | Description |
| --- | --- |
| Iron source | metallic iron |
| Copper source | metallic copper |
| Copper addition method | dissolved with iron |
| $HNO_3$ specific gravity | 1.08 sp. gr. $HNO_3$ (14%) |
| $HNO_3$ Used | 3.5:1 acid:iron ratio |
| Iron Dissolution Temperature | <35° C. |
| Iron Solution Temperature | 70-35° C. |
| Base | 4M $NH_4OH$ |
| Base Temp. for Precipitation | 25° C. |
| Precipitation Temp. | 35° C. |
| Precipitation pH | 7.1 |
| Total Time for Precipitation | 90 min. |
| Ripen Time | 0.5 h |
| Potassium source | $K_2CO_3$ |
| Mode of potassium addition | slurried before spray drying |
| Drying technique | spray drying |
| Calcination temperature | 300° C./16 h; ramp at 30° C./min |

Example 2

Catalyst Prepared with Ferrous Nitrate Solution Only

This example delineates the steps used in preparing a catalyst using ferrous nitrate only.

1. Iron powder (15 g) was slurried with 114.4 g of DI water to prevent hot spots due to exothermic reaction during the dissolution process.

2. Nitric acid, 49.8 g of 68% $HNO_3$, was dissolved in 400.0 g DI water.

3. With mechanical stiffing, the nitric acid solution was added dropwise to the iron slurry which was cooled by an ice bath. The temperature of the iron solution was maintained below 30° C.

4. After complete addition of the nitric acid solution, the dark green iron solution was stirred until the iron was completely dissolved.

5. This dark green ferrous nitrate solution was filtered through a fine filter paper.

6. The total volume of ferrous nitrate solution obtained in Step 5 was about 550 mL.

7. A 49.3 g of 29% ammonium hydroxide was diluted by DI water to 550 mL at room temperature.

8. The base solution at 22° C. obtained in Step 7 was added slowly to the ferrous nitrate solution at 22° C. over a 10 minute period while monitoring the pH of the solution. Neither solution was heated. Precipitation ended at pH 7.30.

9. The mixture was filtered and washed three times with 1000 mL of water for each washing. The precipitate was green in color. The residue was washed until the pH was near 7.0. The filter cake was dried sufficiently so that it was easily removed from the filter paper.

10. The filter cake was dried slowly, ground, and dried at 120° C. in an oven overnight.

11. An aqueous solution of 0.5703 g of $Cu(NO_3)_2.3H_2O$ was impregnated onto the dried and ground powder by the incipient wetness method.

12. The wet powder was dried at 120° C. in an oven overnight.

13. An aqueous solution of 0.2651 g of $K_2CO_3$ was then impregnated onto the ground powder by the incipient wetness method.

14. The wet powder was dried at 120° C. in an oven overnight.

15. The ground powder material was placed in an oven and was first ramped to 125° C. at the rate of 2° C./min, and held at 125° C. for 5 h. It was then heated to 300° C. at the same rate, and held at 300° C. for 16 h.

Example 3

Catalyst Prepared with 20% Ferrous/80% Ferric Nitrate Solution

Preparation of Ferric Nitrate Solution:

1. The iron powder (8.0 g) was slurried with 8.5 g DI water to prevent hot spots due to exothermic reaction during the dissolution process.

2. Nitric acid, 39.8 g of 68% $HNO_3$, was dissolved in 60.0 g DI water.

3. With mechanical stiffing, the nitric acid solution was added dropwise to the iron slurry which was cooled by ice bath. The temperature of the iron solution did not exceed 30° C.

4. After complete addition of the nitric acid solution, the light green solution was stirred until the iron is completely dissolved.

5. The light green iron nitrate solution was filtered through fine filter paper.

6. This iron nitrate solution is then heated to 70° C. at 3° C./min to make sure all iron in iron nitrate solution in ferric state. Evolution of $NO_x$ gases with reddish brown color was observed. During this heating period, the color of this mixture changed from a light green to a reddish brown, and ferric nitrate solution was obtained.

7. The ferric nitrate solution was cooled down to room temperature.

Preparation of Ferrous Nitrate Solution:

8. The iron powder (2 g) was slurried with 8.6 g DI water to prevent hot spots due to exothermic reaction during the dissolution process.

9. Nitric acid, 6.6 g of 68% $HNO_3$, was dissolved in 60.0 g DI water.

10. With mechanical stirring, the nitric acid solution was added dropwise to the iron slurry which was cooled by ice bath. The temperature of the iron solution did not exceed 30° C.

11. After complete addition of the nitric acid solution, the dark green iron solution was stirred until the iron is completely dissolved.

12. This dark green ferrous nitrate solution was filtered through fine filter paper.

Mixing of Ferrous Nitrate and Ferric Nitrate Solutions:

13. The ferric nitrate solution obtained in Step 7 and the ferrous nitrate solution obtained in Step 12 were mixed at 22° C. The total volume of ferrous and ferric nitrates solution was about 300 mL. The pH of the mixture was 2.20.

14. A 32.9 g of 29% ammonium hydroxide was diluted by DI water to 300 mL, same volume of nitrates solution at room temperature.

15. The base solution at 22° C. (obtained in Step 14) is added slowly to the ferrous and ferric nitrates solution at 22° C. (obtained in Step 13) over 10 minutes while monitoring the pH of the solution. Neither solution was heated. Precipitation ended at pH 7.22.

16. The mixture is filtered and washed three times with 1000 mL of water for each washing. The precipitate was dark brown in color. The residue was washed until pH is near neutral. Alternative methods can also be used to measure nitrates.

17. The filter residue was dried sufficiently so that it was easily removed from the filter paper. It was dried slowly, ground, and dried at 120° C. in an oven overnight. Aqueous solution of 0.3802 g of $Cu(NO_3)_2 \cdot 3H_2O$ was impregnated onto ground powder by incipient wetness method, and dried at 120° C. in an oven overnight. Aqueous solution of 0.1767 g of $K_2CO_3$ was then impregnated onto the ground powder by incipient wetness method, and dried at 120° C. in an oven overnight.

18. The ground powder material placed in an oven was first ramped to 125° C. at the rate of 2° C./min, held at 125° C. for 5 h, and then it was heated up to 300° C. at the same rate, and held at 300° C. for 16 h.

Example 4

Catalyst Prepared with 50% Ferrous Nitrate+50% Ferric Nitrate Solution

This example lists the steps used in preparing a catalyst using a mixture comprising 50% by weight ferrous iron and 50% by weight ferric iron in nitrate solutions prepared separately.

Preparation of Ferric Nitrate Solution:

1. The iron powder (5.0 g) was slurried with 7.8 g DI water to prevent hot spots due to exothermic reaction during the dissolution process.

2. Nitric acid, 24.90 g 68% $HNO_3$, was dissolved in 35.0 g DI water.

3. With mechanical stiffing, the nitric acid solution was added dropwise to the iron slurry which was cooled by an ice bath. The temperature of the iron solution did not exceed 30° C.

4. After complete addition of the nitric acid solution, the light green iron solution was stirred until the iron was completely dissolved.

5. The light green iron nitrate solution was filtered through fine filter paper.

6. This iron nitrate solution was then heated to 70° C. at 3° C./min to make sure all iron in the iron nitrate solution was in the ferric state. Evolution of $NO_x$ gases with reddish brown color was observed. During this heating period, the color of this mixture changed from a light green to a reddish brown.

7. The ferric nitrate solution was cooled down to room temperature.

Preparation of Ferrous Nitrate Solution:

8. The iron powder (5.0 g) was slurried with 21.4 g DI water to prevent hot spots due to exothermic reaction during the dissolution process.

9. Nitric acid, 16.6 g of 68% $HNO_3$, was dissolved in 150.0 g DI water.

10. With mechanical stiffing, the nitric acid solution was added dropwise to the iron slurry which was cooled by an ice bath. The temperature of the iron solution did not exceed 30° C.

11. After complete addition of the nitric acid solution, the dark green iron solution was stirred until the iron was completely dissolved.

12. This dark green ferrous nitrate solution was filtered through fine filter paper.

Mixing of Ferrous and Ferric Nitrate Solutions:

13. The ferric nitrate solution obtained in Step 7 and ferrous nitrate solution obtained in Step 12 were mixed at 22° C. The total volume of ferrous and ferric nitrates solution was about 260 mL. The pH of the mixture was 2.23.

14. A 32.9 g of 29% ammonium hydroxide was diluted by DI water to 260 mL, the same volume of the nitrates solution at room temperature.

15. The base solution at 22° C. (obtained in Step 14) was added slowly to the ferrous and ferric nitrates solution at 22° C. over a 10 minute period while monitoring the pH of the solution. Neither solution was heated. Precipitation ended at pH 7.3.

16. The mixture was filtered and washed three times with 1000 mL of water for each washing. Filtration was very slow and the precipitate was dark in color. The residue was washed until the pH was near 7.0.

17. The filter residue was dried sufficiently so that it was easily removed from the filter paper. It was dried slowly, ground, and dried at 120° C. in an oven overnight. An aqueous solution of 0.3802 g of $Cu(NO_3)_2 \cdot 3H_2O$ was impregnated onto the ground powder by the incipient wetness method, and dried at 120° C. in an oven overnight. An aqueous solution of 0.1767 g of $K_2CO_3$ was then impregnated onto the ground powder by incipient wetness, and dried at 120° C. in an oven overnight.

18. The ground powder material placed in an oven was first ramped to 125° C. at the rate of 2° C./min, held at 125° C. for 5 h, and then it was heated up to 300° C. at the same rate, and held at 300° C. for 16 h.

Example 5

Catalyst Prepared with 80% Ferrous/20% Ferric Nitrate Solution

This example lists the steps used in preparing a catalyst using a mixture comprising 80% by weight ferrous iron and 20% by weight ferric iron in nitrate solutions prepared separately.

Preparation of Ferric Nitrate Solution:

1. The iron powder (2.0 g) was slurried with 2.1 g DI water to prevent hot spots due to exothermic reaction during the dissolution process.

2. Nitric acid, 6.8 g of 68% $HNO_3$, was dissolved in 15.0 g DI water.

3. With mechanical stiffing, the nitric acid solution was added dropwise to the iron slurry which was cooled by an ice bath. The temperature of the iron solution did not exceed 30° C.

4. After complete addition of the nitric acid solution, the light green solution was stirred until the iron was completely dissolved.

5. The light green iron nitrate solution was filtered through fine filter paper.

6. This iron nitrate solution was then heated to 70° C. at 3° C./min to make sure all iron in the iron nitrate solution was in the ferric state. Evolution of $NO_x$ gases with reddish brown color was observed. During this heating period, the color of this mixture changed from a light green to a reddish brown.

7. The ferric nitrate solution was cooled down to room temperature.

Preparation of Ferrous Nitrate Solution

8. The iron powder (8.0 g) was slurried with 24.4 g DI water to prevent hot spots due to exothermic reaction during the dissolution process.

9. Nitric acid, 26.6 g of 68% $HNO_3$, was dissolved in 250.0 g DI water.

10. With mechanical stiffing, the nitric acid solution was added dropwise to the iron slurry which was cooled by an ice bath. The temperature of the iron solution did not exceed 30° C.

11. After complete addition of the nitric acid solution, the dark green solution was stirred until the iron was completely dissolved.

12. This dark green ferrous nitrate solution was filtered through fine filter paper.

Mixing of Ferrous and Ferric Nitrate Solutions:

13. The ferric nitrate solution obtained in Step 7 and ferrous nitrate solution obtained in Step 12 were mixed at 22° C. The total volume of ferrous and ferric nitrates solution was about 350 mL. The pH of the mixture was 1.76.

14. A 32.9 g of 29% ammonium hydroxide was diluted by DI water to 350 mL, the same volume of nitrates solution at room temperature.

15. The base solution at 22° C. (obtained in Step 14) was added slowly to the ferrous and ferric nitrates solution at 22° C. (obtained in Step 13) over 10 minutes while monitoring the pH of the solution. Neither solution was heated. Precipitation ended at pH 7.26 at 25° C.

16. The mixture was filtered and washed three times with 1000 mL of water for each washing. The precipitate was dark in color. The residue was washed until pH was near 7.0. The filter residue was dried sufficiently so that it was easily removed from the filter paper. It was dried slowly, ground, and dried at 120° C. in an oven overnight. An aqueous solution of 0.3802 g of $Cu(NO_3)_2 \cdot 3H_2O$ was impregnated onto ground powder by incipient wetness, and dried at 120° C. in an oven overnight. An aqueous solution of 0.1767 g of $K_2CO_3$ was then impregnated onto the ground powder by incipient wetness method, and dried at 120° C. in an oven overnight.

17. The ground powder material placed in an oven was first ramped to 125° C. at the rate of 2° C./min, held at 125° C. for 5 h, and then it was heated up to 300° C. at the same rate, and held at 300° C. for 16 h.

Example 6

Catalyst Prepared with Ferric Nitrate Solution Only (Comparative Catalyst)

1. The iron powder (15.0 g) was slurried with 23.4 g DI water to prevent hot spots due to exothermic reaction during the dissolution process.

2. Nitric acid, 74.7 g of 68% $HNO_3$, was dissolved in 105.0 g DI water.

3. With mechanical stiffing, the nitric acid solution was added dropwise to the iron slurry which was cooled by ice bath. The temperature of the iron solution did not exceed 30° C.

4. After complete addition of the nitric acid solution, the light green iron solution was stirred until the iron is completely dissolved.

5. The light green iron nitrate solution was filtered through a fine course filter paper.

6. This iron nitrate solution is then heated to 70° C. at 3° C./min to make sure all iron in iron nitrate solution in ferric state. Evolution of $NO_x$ gases with reddish brown color was observed. During this heating period, the color of this mixture changed from a light green to a reddish brown, and ferric nitrate solution was obtained.

7. The ferric nitrate solution was cooled down to 22° C.

8. The total volume of the solution obtained in Example 5, Step 7 was about 200 mL.

9. A 49.3 g of 29% ammonium hydroxide was diluted by DI water to 200 mL, same volume of nitrates solution at room temperature.

10. The base solution at 22° C. (obtained in Example 5, Step 9) was added slowly to the ferric nitrate solution at 22° C. (obtained in Example 5, Step 8) over 10 minutes while monitoring the pH of the solution. Neither solution was heated. Precipitation ended at pH 7.39.

11. The mixture was filtered and washed three times with 1000 mL of water for each washing. The precipitate was dark in color. The residue was washed until pH is near neutral. Alternative methods can also be used to measure nitrates.

12. The filter residue was dried sufficiently so that it was easily removed from the filter paper. It was dried slowly, ground, and dried at 120° C. in an oven overnight. An aqueous solution of 0.5703 g of $Cu(NO_3)_2 \cdot 3H_2O$ was impregnated onto the ground powder by incipient wetness method, and dried at 120° C. in an oven overnight. An aqueous solution of 0.2651 g of $K_2CO_3$ was then impregnated onto the ground powder by incipient wetness method, and dried at 120° C. in an oven overnight.

13. The ground powder material placed in an oven was first ramped to 125° C. at the rate of 2° C./min, held at 125° C. for 5 h, and then it was heated up to 300° C. at the same rate, and held at 300° C. for 4 h.

Example 7

Comparison of Catalysts from Examples 2 Through 6

The five catalysts prepared in Examples 2 through 6 were tested for their performance in catalyzing the hydrogenation of carbon monoxide (the Fischer-Tropsch reaction) in a 2 liter autoclave (continuous stirred tank reactor).

The raw catalysts were slurried in a synthetic oil and activated in the autoclave using synthesis gas under the following conditions:

| | |
|---|---|
| $H_2$:CO Ratio: | 1.40 |
| Temperature: | 275° C. (No ramp) |
| Pressure: | 140 Psig |
| Space Velocity: | 2.4 NL($H_2$ + CO)/h/gFe |
| Time: | 5-6 h |

After activation, the conditions were changed to operating conditions:

| | |
|---|---|
| $H_2$:CO Ratio: | 0.77 |
| Temperature: | 255° C. (No ramp) |
| Pressure: | 375 Psig |
| Space Velocity: | 3.1 NL($H_2$ + CO)/h/gFe |

Approximately 10% by volume of $N_2$ was fed along with the $H_2$ and CO for use as an internal standard.

Figure 3:
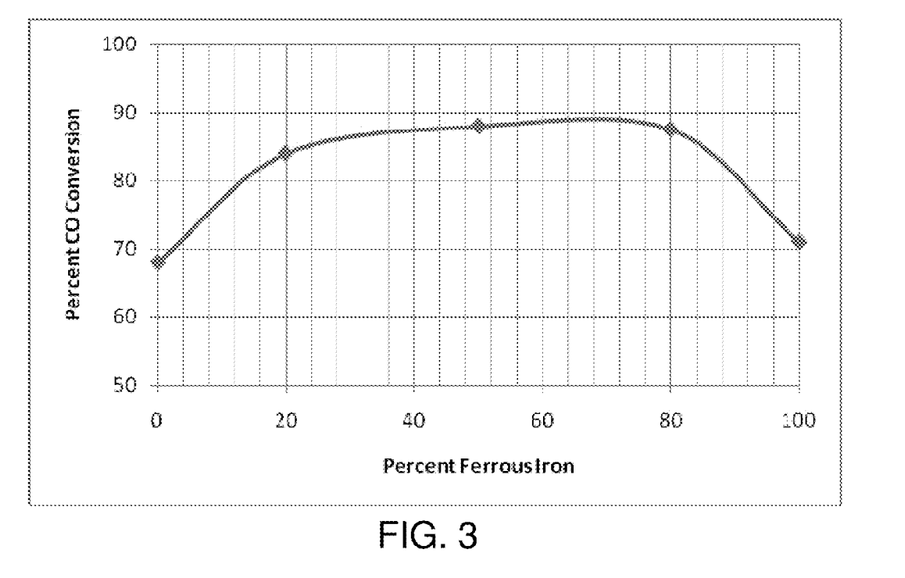
FIG. 3 is a plot of measured carbon monoxide conversion versus weight percent of ferrous iron in the nitrate solution.

In Table 4 below, values of CO conversion are tabulated at four different times to show the relative activity and stability of the different catalysts. These results are plotted in FIG. 3.

TABLE 4

CO Conversion Comparisons

| Catalyst | % Ferrous | % Ferric | @100 h | @150 h | @200 h | @250 h |
|---|---|---|---|---|---|---|
| Example 2 | 100 | 0 | 79.0 | 78.0 | 74.5 | 71.0 |
| Example 3 | 20 | 80 | 86.0 | 85.0 | 84.0 | 84.0 |
| Example 4 | 50 | 50 | 90.5 | 90.5 | 90.0 | 88.0 |
| Example 5 | 80 | 20 | 88.5 | 88.0 | 87.5 | 87.5 |
| Example 6 (Comparative Catalyst) | 0 | 100 | 72.0 | 72.5 | 70.5 | 68.0 |

Figure 4:
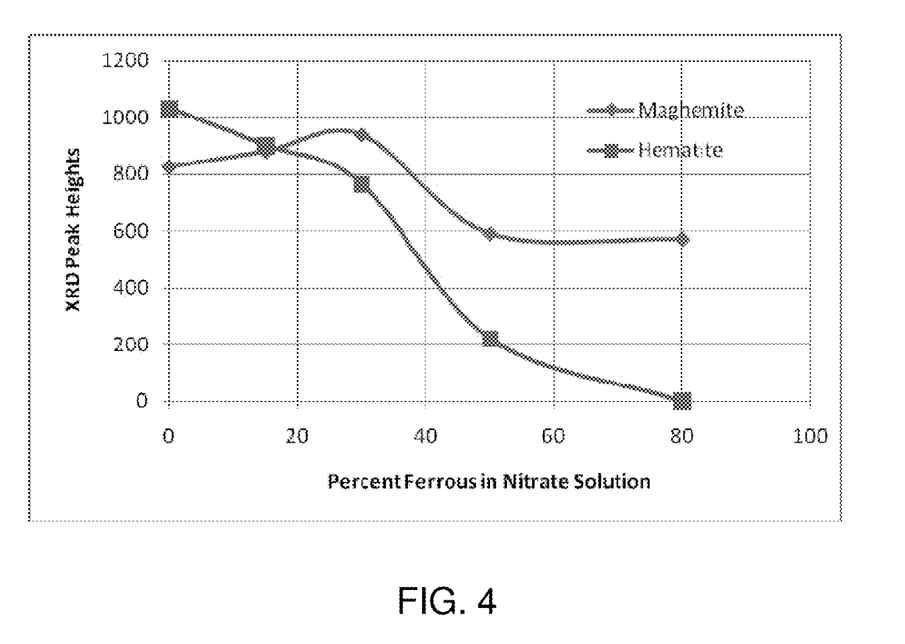
FIG. 4 is a plot of measured XRD peak heights of maghemite and hematite versus weight percent of ferrous iron in the nitrate solution for a calcination temperature of 380° C.
Figure 5:
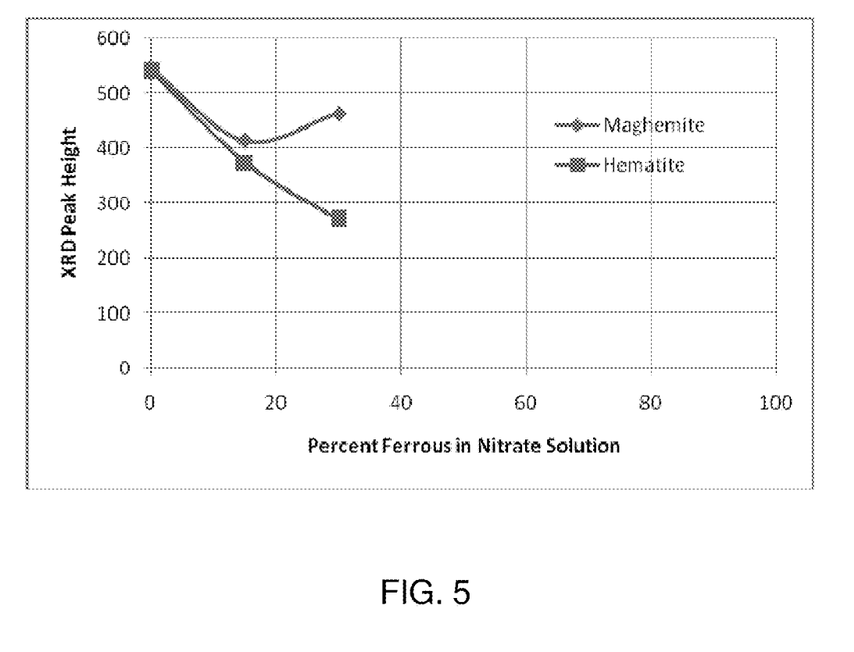
FIG. 5 is a plot of measured XRD peak heights of maghemite and hematite versus weight percent of ferrous iron in the nitrate solution for a calcinations temperature of 300° C.

FIG. 4 is a plot of measured XRD peak heights of maghemite and hematite versus weight percent of ferrous iron in the nitrate solution for a calcination temperature of 380° C. FIG. 5 is a plot of measured XRD peak heights of maghemite and hematite versus weight percent of ferrous iron in the nitrate solution for a calcinations temperature of 300° C.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the representative description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

What is claimed is:

1. A process for hydrogenating carbon monoxide to form a Fischer-Tropsch hydrocarbon product, the process comprising:
   providing a catalyst comprising iron, copper and potassium, wherein the weight ratio of iron to copper is in the range of from about 100:0.2 to about 100:2 and the weight ratio of iron to potassium is in the range of from about 100:0.5 to about 100:1.5, and wherein the iron in the catalyst comprises a maghemite:hematite weight ratio in the range of about 1%:99% to about 70%:30%;
   activating the catalyst by exposure to a gas comprising carbon monoxide, hydrogen, or a combination thereof for a selected period of time at selected levels of pressure, temperature, and space velocity, to produce an activated catalyst; and
   contacting a synthesis gas stream with the activated catalyst in a Fischer-Tropsch slurry-bed reactor whereby a Fischer-Tropsch hydrocarbon product is obtained.

2. The process of claim 1 wherein the weight ratio of maghemite to hematite in the catalyst is about 10%:90%.

3. The process of claim 1 wherein the catalyst comprises a particulate structure with a particle size distribution in the range of 10 μm-100 μm.

4. The process of claim 1 wherein the catalyst exhibits a BET surface area in the range of from about 45 $m^2$/g to about 65 $m^2$/g.

5. The process of claim 1 wherein the catalyst has a mean pore diameter in the range of from about 75 Å to about 120 Å.

6. The process of claim 1 wherein the catalyst has a mean pore volume in the range of from about 0.20 cc/g to about 0.24 cc/g.

7. The process of claim 1 wherein the catalyst has a mean crystallite size in the range of from about 25 nm to about 29 nm.

8. The process of claim 1 wherein the catalyst is formed by:
preparing an iron nitrate solution having a $Fe^{2+}:Fe^{3+}$ ratio (wt %/wt %) in the range of from about 0.01% $Fe^{2+}$: 99.99% $Fe^{3+}$ to about 100% $Fe^{2+}$:0% $Fe^{3+}$ and comprising copper;
heating the iron nitrate solution to a temperature in the range of about 20° C. to 80° C.;
preparing a precipitating agent solution;
reducing the temperature of the iron nitrate solution to a temperature in the range of from about 25° C. to 35° C. to obtain low temperature iron nitrate solution and reducing the temperature of the precipitation agent solution to a temperature in the range of 25° C. to 80° C. to obtain low temperature precipitating agent solution; and
precipitating a precipitate comprising iron phases and optionally copper phases by reacting the low temperature nitrate solution with the low temperature precipitating agent at a temperature not exceeding 40° C.

9. The process of claim 8 wherein the iron nitrate solution has a $Fe^{2+}:Fe^{3+}$ ratio (wt %/wt %) in the range of from about 3% $Fe^{2+}$:97% $Fe^{3+}$ to about 80% $Fe^{2+}$:20% $Fe^{3+}$.

10. The process of claim 8 wherein the $Fe^{2+}:Fe^{3+}$ weight ratio in the resulting nitrate solution after the heating is about 10%:90%.

11. The process of claim 8 wherein preparing the iron nitrate solution further comprises preparing a ferrous nitrate solution by adding metallic iron or an iron-containing compound and a select amount of nitric acid having a specific gravity less than 1.035 and a ferric nitrate solution by adding metallic iron or an iron-containing compound and a select amount of nitric acid having a specific gravity greater than 1.115 and combining them to provide an iron nitrate solution having a specific gravity greater than 1.01 and less than 1.40.

12. The process of claim 8 further comprising slurrying the precipitate and adding a chemical promoter.

13. The process of claim 12 further comprising drying the slurry to form a catalyst precursor.

14. The process of claim 13 further comprising calcining the catalyst precursor to form a raw catalyst.

15. The process of claim 12 further comprising ripening the precipitate and washing the resulting ripened precipitate to remove nitrates prior to slurrying the precipitate.

16. The process of claim 15 further comprising aging the resulting washed precipitate.

17. The process of claim 12 wherein the chemical promoter comprises a potassium compound selected from the group consisting of $K_2CO_3$, $KHCO_3$, and KOH.

18. The process of claim 8, wherein the precipitating agent comprises a compound selected from the group consisting of $NH_4OH$, $Na_2CO_3$, NaOH, $K_2CO_3$, KOH, $(NH_4)_2CO_3$, $(NH_4)HCO_3$, $NaHCO_3$ and $KHCO_3$.

* * * * *